Dec. 5, 1967  A. K. MILLS ET AL  3,355,943
AIRCRAFT TURN COORDINATOR

Filed Aug. 13, 1965  2 Sheets-Sheet 1

INVENTORS
KARL FRUDENFELD
ALLAN K. MILLS
BY
ATTORNEY

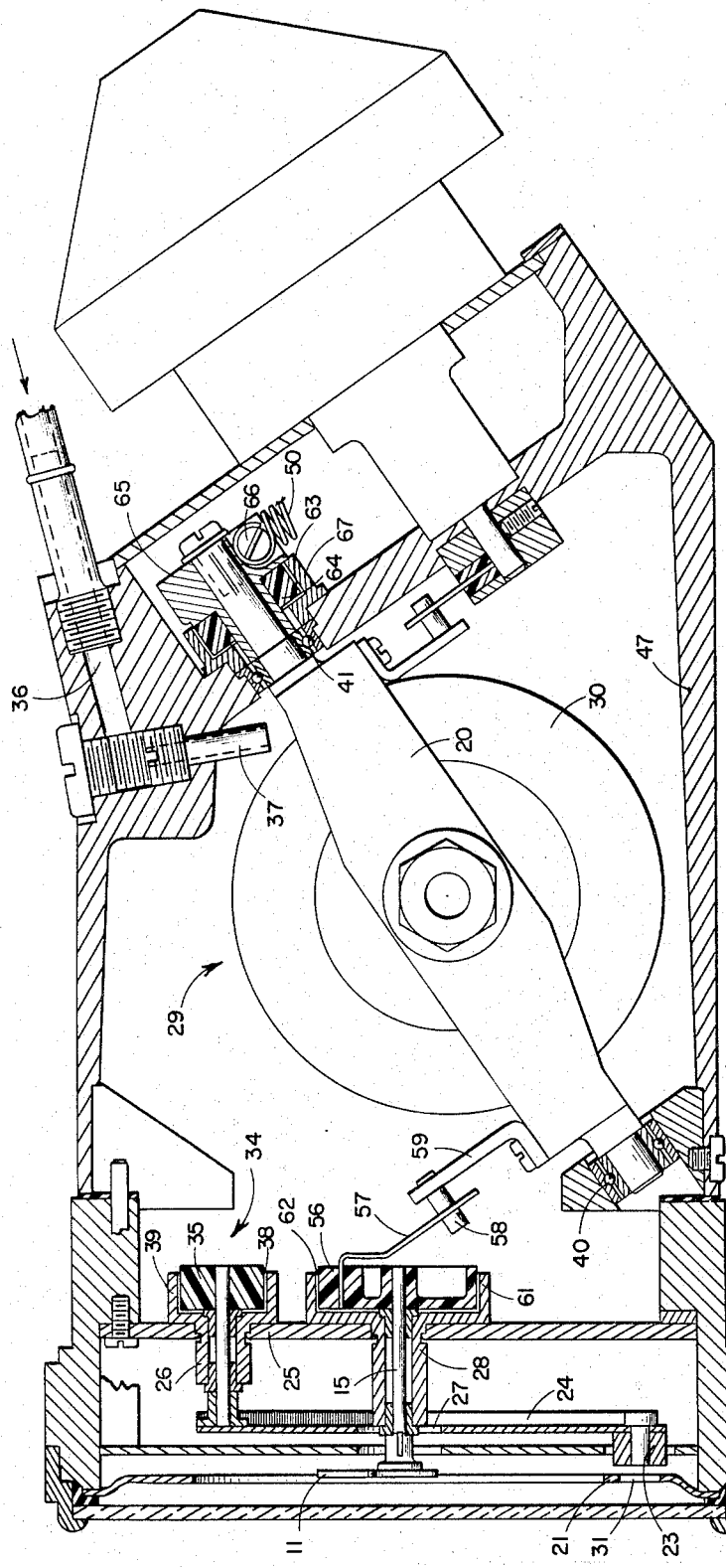

United States Patent Office 3,355,943
Patented Dec. 5, 1967

3,355,943
AIRCRAFT TURN COORDINATOR
Allan K. Mills, Canoga Park, and Karl Frudenfeld, Rolling Hills, Calif., assignors to Brittain Industries, Inc., Hawthorne, Calif., a corporation of California
Filed Aug. 13, 1965, Ser. No. 479,487
12 Claims. (Cl. 73—178)

ABSTRACT OF THE DISCLOSURE

A rate gyroscope is mounted in an aircraft so that it is canted with respect to the longitudinal flight axis of the aircraft to sense predetermined components of yaw and roll rate. The gyroscope gimbal is coupled to an indicator dial through a light spring member which damps out short term perturbation signals in the output of the gyro to provide an indicator reading for enabling a coordinated turn. A fluid damper unit including a pair of concentric cup members is utilized to provide additional damping on the indicator thus eliminating all significant response of the indicator to short term perturbation signals.

---

Figure 1:
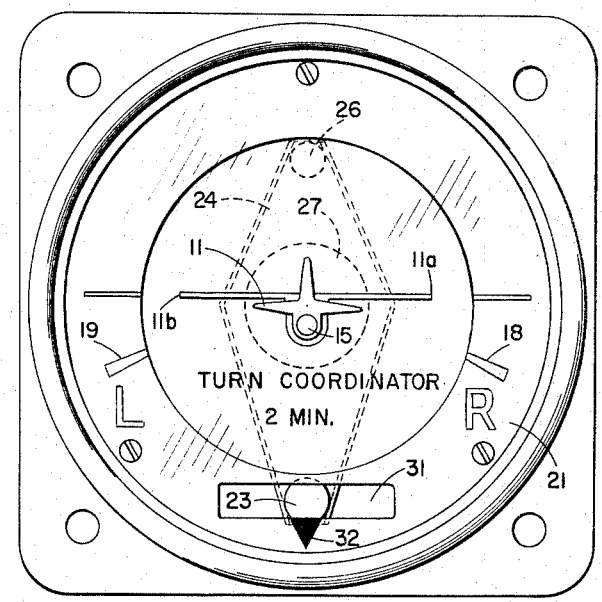

This invention relates to an aircraft turn coordinator, and more particularly to such a device utilizing a rate gyro sensor to produce a direct indication to precisely guide the maneuvering of an aircraft.

In aiding a pilot in making a turn, a turn indicator is often utilized which comprises a rate gyroscope which senses yaw rate. In utilizing this instrument, the pilot flies the aircraft to match a needle with a particular scale and thus is enabled to effect the desired turn. In initiating a coordinated turn maneuver, an aircraft is rolled or banked in the direction of the turn, the rolling of the aircraft to any given bank angle resulting in a turning rate thereof. Most turn indicators of the prior art in no way indicate the rolling of the aircraft as it is occurring and thus fail to anticipate the turning maneuver resulting therefrom. Thus, often an inexperienced pilot will over-control the aircraft with such devices, thereby resulting in an inaccurate turn maneuver. Further, often at the very beginning of a roll maneuver, a slight yaw rate signal is sensed by prior art devices which causes the indicator needle to move in a direction opposite to that which would normally be expected. This ambiguous indication is disconcerting to the pilot and tends to cause over-maneuvering, especially in the case of an inexperienced pilot.

Turn indicators of the prior art also are highly inadequate in enabling a pilot to make a coordinated recovery from an inadvertent spiral condition. This is in view of the fact that such indicators provide an indication of turn rate only and do not indicate roll rate.

The device of this invention overcomes the shortcomings of prior art turn indicators in providing an indicating device which is responsve to the sum of the yaw and the roll rates of the arcraft. This indicated output thus anticipates the resulting turn rate of the aircraft by sensing roll rate so as to provide a true indication of turn conditions. In addition, when aircraft roll rate is zero, the output solely indicates yaw rate. In view of the roll rate signal, no ambiguous opposite direction signals are indicated. Also, the roll rate signal facilitates the recovery from an inadvertent spiral condition. Further, damping means are provided in the device of the invention to eliminate readings resulting from extraneous motions of the aircraft, such as would be caused by gusts or other short term disturbances.

The improved end results are achieved in the device of the invention by utilizing a rate gyroscope sensor which is canted so that it senses predetermined components of yaw and roll rate, whereby the gyroscope gimbal precesses to produce an output indicative of the sum of these rates. An output reading is provided by means of a rotatable indicator which rotates in an amount proportional to the sum of the sensed yaw and roll rates. The gyroscope gimbal is coupled to the indicator through a novel damper assembly which effectively eliminates short-term disturbance signals and provides smooth indicator response. Even relatively inexperienced pilots are thus enabled to accurately perform turn maneuvers merely by matching up the rotatable indicator pointer with a fixed dial scale.

It is therefore an object of this invention to provide an improved aircraft turn coordinating instrument.

It is a further object of this invention to lessen the hazards involved in maneuvering an aircraft.

It is still a further object of this invention to provide a turn indicating device in which short-term disturbances are effectively eliminated.

It is still another object of this invention to provde an improved turn indicating device in which the turning rate is anticipated by utilizing a roll rate signal.

It is still a further object of this invention to provide an improved turn coordinator utilizing a canted rate gyroscope which produces an indicator output proportional to the sum of yaw and roll rates.

Figure 4:
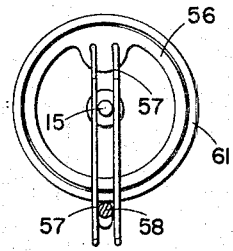
Figure 3:
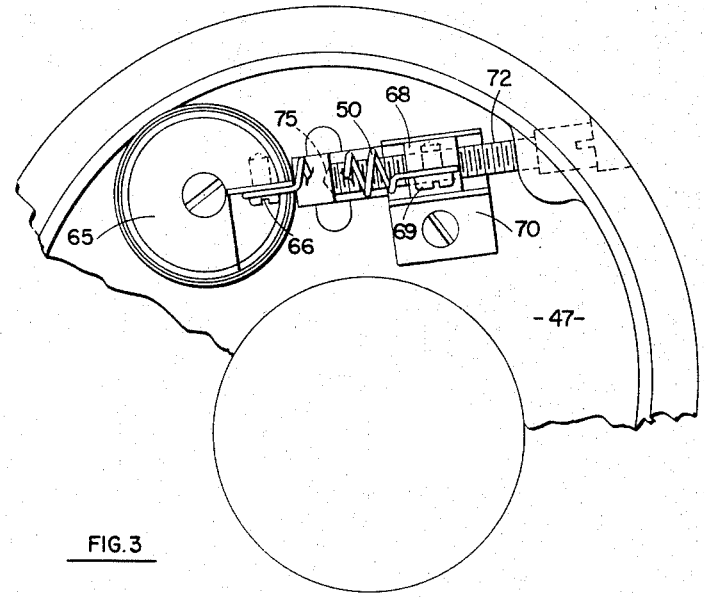

Other objects of this invention will become apparent from the following description taken in connection with the accompanying drawings of which, FIG. 1 is a plan view of an indicator which may be utilized in the device of the invention, FIG. 2 is an elevation cross sectional view of a preferred embodiment of the device of the invention, FIG. 3 is a plan view illustrating the sensitivity adjustment utilized in the preferred embodiment of the device of the invention, and FIG. 4 is a plan view illustrating the viscous damper mechanism utilized in the preferred embodiment of the device of the invention.

Referring now to FIG. 1, an indicator device which may be utilized in the device of the invention is shown. Rotatable dial member 11, which is in the form of an aircraft silhouette, is fixedly attached to shaft 15 which in turn is coupled to gyroscope gimbal 20. With the precession of the gyroscope gimbal 20 in response to aircraft yaw and roll rate, indicator 11 is rotated with shaft 15. For yaw and roll rates in a right hand direction, indicator 11 is rotated to the right, and vice versa. The rate gyroscope is calibrated, as to be explained in connection with FIGS. 2 and 3, so that, for any particular aircraft, if the wing tip portion 11a of indicator 11 is kept in line with index 18, etched on stationary dial face 21, a complete 360° turn will be accomplished in a predetermined period of time, such as, for example, two minutes. Similarly, a complete left-hand turn can be made by matching wing tip 11b with dial index 19 for the prescribed time period.

Referring additionally to FIG. 2, a side slip indicator is provided by means of pendulously suspended mass 23 which is supported on arm 24. Arm 24 is rotatably supported on casing wall 25 in support bearing 26. Damping is provided for arm 24 to eliminate short term disturbance vibrations by means of fluid damper assembly 34, which comprises an inner cylindrical member 35 attached to arm 24 which is damped by damping fluid 38 contained between the outer walls of member 35 and the inner walls of cup member 39, which is attached to casing wall 25. The central portion of arm 24 has an aperture 27 formed therein to avoid interference between the arm and bearing sleeve 28. Pendulously suspended mass 23 appears in window 31 formed in dial face 21, and side slip is indicated when index 32, etched on dial face 21, is not aligned with mass 23.

Referring now to FIG. 2, an elevation view of a preferred embodiment of the device of the invention is shown.

The rotor 30 of rate gyroscope 29 is rotatably mounted on gimbal 20 on suitable rotation bearings (not shown). Rotor is rotated at relatively high speed by means of a pneumatic drive fed thereto through input feed tubes 36 and 37. Rotor 30 has a plurality of turbine drive vanes (not shown) around its outer circumference against which the airstream impinges to provide the desired rotation. Gyro rotors driven in this fashion are well known in the art and any suitable such device may be utilized. If so desired, an electrical drive may be utilized. The gyroscope gimbal 20 is rotatably mounted on bearings 40 and 41. Gimbal 20 is resiliently constrained to gyro casing 47 by means of spring 50 (see FIG. 3) which joins the gimbal to the casing. As to be explained in connection with FIG. 3, spring 50 is part of a sensitivity adjustment mechanism by means of which the instrument can be calibrated.

Gimbal 20 is coupled to cup member 56, which is preferably fabricated of plastic, by means of spring member 57. Spring member 57 is preferably a light spring formed in a looped configuration. The open ends of spring member 57 straddle post 58 which is connected to gimbal 20 through arm 59. The looped end of spring member 57 is fitted into cup member 56 so that it is retained therein, as shown in FIG. 4.

Referring to both FIGS. 2 and 4, plastic cup member 56 is rotatably supported in a surrounding outer metallic cup member 61. A damper is formed between inner and outer cup members 56 and 61 by viscous fluid 62 contained therebetween. A constant damping between cup members 56 and 61 is assured under varying temperature conditions by virtue of the dissimilar coefficients of expansion of the plastic material of which inner member 56 is fabricated and the metallic material of which outer cup 61 is fabricated. Thus, with increases in temperature and the resultant decrease in the viscosity of the fluid, the plastic material will tend to expand more than the metallic material to make for a closer fit, and vice versa. In this manner, variations in temperature are automatically compensated for to make for a damper having relatively constant damping characteristics.

Fixedly attached to inner member 56, as, for example, by force fitting, is shaft 15, to which indicator 11 is fixedly attached.

The desired damping to eliminate short-term disturbances, such as caused by turbulences and the like, is effectively achieved by means of a damping system which includes light spring 57 operating in conjunction with damping fluid 62. This damping mechanism in the direct coupling to the indicator has been found to provide very smooth response of indicator 11 to the relatively long term turn inputs, even when flying in rough air.

Gyroscope gimbal 20 is vertically canted with respect to the aircraft longitudinal flight axis at an angle of between 20 and 40 degrees with an angle of 35 degrees found to be most satisfactory in a particular operative embodiment. The cant angle, of course, determines the relative amount of yaw rate and of roll rate which will appear in the output signal. This angle, thus is adjusted to produce the optimum output signal to provide the desired indication.

Referring now to FIG. 3, the sensitivity adjustment utilized in the preferred embodiment of the device of the invention is shown. Spring 50 is attached at one end thereof to shaft member 65 of gimbal 20 by means of screw 66 (refer additionally to FIG. 2). The other end of spring 50 is attached to block 68 by means of screw 69. Block 68 is slidably mounted in holder member 70 which is attached to casing 47. Adjustment screw 72 threadably engages the inner wall of an aperture formed in slidable block 68. The end of screw 72 abuts against the wall 75 of a recess formed in casing 47. Thus, screw 72 can be rotated to slidably position block 68 in retainer 70. In this manner, the tension on spring 50 can be varied, thus changing the holding force restraining gimbal 20. It thus can be seen that adjustment screw 72 can be utilized to vary the rotational response of gimbal 20 for any given combined roll and yaw rate input.

The rotation of gimbal 20 is damped by means of the damper mechanism comprising damping fluid 63 contained between inner cylindrical member 64, which is attached to gimbal member 65, and outer cup member 67, which is attached to casing 47. This damper operates in the same fashion as the previously described damper mechanisms to damp out short-term disturbances.

For all of the damper mechanisms, it has been found, in an operative embodiment of the device of the invention, that a silicone fluid having 30,000 centistokes viscosity operates quite satisfactorily for damping fluids 62, 63 and 38.

In operation, gimbal 20 is precessed rotatably in one direction or the other in accordance with the combined roll rate and yaw rate of the aircraft. This rotation of gimbal 20 is coupled through spring 57 and inner cup member 56 to shaft 15 which drives indicator 11. Short-term disturbances, such as caused by turbulent air conditions, are effectively damped out by virtue of the damping action of fluid 62. In flying the aircraft to make a particular turn, the pilot need merely line up either indicator wing tip 11a or 11b with fixed index 18 or 19 respectively and maintain this lined-up condition for the time period prescribed for the particular turn in question. The aircraft, of course, is flown, while making the turn, with no side slip acceleration being indicated on the side slip indicator comprising pendulously suspended mass 23.

It is to be noted that a particular feature of the device of the invention not present in prior art devices is the utilization of an inner indicator 11 in the form of an aircraft which moves in the same direction as the aircraft itself in making the turn. It has been found that this type of presentation is much easier for the pilot to utilize, especially in the case of relatively new and inexperienced pilots.

The device of this invention thus provides a simple yet highly effective means for facilitating the turning of an aircraft. An indication is provided which anticipates the turn and enables the pilot to make a smooth maneuver with little chance of his being confused by the indication provided.

While the device of the invention has been described and illustrated in detail, it is to be clearly understood that this is intended for the purposes of illustration and example only and is not to be taken by way of limitation, the spirit and scope of this invention being limited only by the terms of the following claims.

We claim:

1. In a device for coordinating the turning of an aircraft,
    support means,
    a rate gyroscope mounted on said support means, said rate gyroscope including a gimbal, bearing means for supporting said gimbal on said support means for rotation about a first axis defining the precession axis of said gyroscope, said first axis being vertically canted with respect to the longitudinal flight axis of said aircraft,
    indicator means for providing an indication in accordance with the rotational precession of said gimbal, said indicator means including a rotational dial member rotatably mounted on said support means and a fixed dial member fixedly mounted on said support means adjacent to said rotational dial member, and
    means for coupling said gimbal to said rotational dial member, said coupling means including damper means interconnecting said gimbal and said dial member for damping out short term disturbances in the rotational output of said gimbal,
    whereby said rotational dial member rotates relative to said fixed dial member to provide an indication in accordance with the sum of the yaw and roll rates of the aircraft.

2. The device as recited in claim 1 wherein said rotational dial member is internally concentric with said fixed dial member.

3. A device for generating an indication of the sum of the yaw and roll rates of an aircraft to enable the maneuvering of such aircraft comprising
a first indicator member,
support means for rotatably supporting said first indicator member,
a second indicator member fixedly mounted on said support means adjacent to said first indicator member, and
a rate gyroscope including a gimbal and a rotor mounted on said gimbal for rotation about a first axis, said gimbal being mounted on said support means for rotation about a second axis defining the precession axis of said gyroscope, said second axis being substantially normal to said first axis, said second axis being vertically canted with respect to the longitudinal flight axis of said aircraft,
spring means for coupling said gimbal to said first indicator member, and
means for damping said first indicator member to eliminate short term disturbances from the rotational output thereof.

4. The device as recited in claim 3 wherein said first indicator member is internally concentric with said second indicator member.

5. The device as recited in claim 3 and additionally including fluid damper means for damping said gimbal to minimize short term vibrational rotation thereof.

6. A turn coordinator device for use in coordinating the turning of an aircraft comprising,
a casing,
a rate gyroscope including a rotor member, a gimbal member for rotatably supporting said rotor member for rotation about a first axis, said gimbal member having a bearing shaft, and bearing means for rotatably supporting said gimbal member on said shaft in said casing for rotation about a second axis substantially normal to said first axis,
said gimbal being oriented so that said second axis is vertically canted with respect to the longitudinal flight axis of the aircraft,
indicator means for providing an indication in accordance with the rotational precession of said gimbal, and
means for coupling said gimbal to said indicator means, said coupling means including spring damper means interconnecting said gimbal and said indicator means and fluid damper means for damping out short term disturbances in the rotational output of said gimbal, whereby said indicator rotates to produce an indication in accordance with the sum of the yaw and roll rates of said aircraft.

7. The device as recited in claim 6 wherein said second axis is canted at an angle of between 20 and 40 degrees with respect to the aircraft longitudinal flight axis.

8. The device as recited in claim 6 wherein said second axis is canted at an angle of substantially .35°.

9. The device as recited in claim 6 and additionally including fluid damper means for damping the rotation of said gimbal, said fluid damper means including a cylindrical member attached to said gimbal bearing shaft, a cup member attached to said casing, and a viscous damping fluid contained between said cup member and said cylindrical member.

10. A device for generating an indication of the sum of the yaw and roll rates of an aircraft to enable the maneuvering of such aircraft comprising
a first indicator member,
support means for rotatably supporting said first indicator member,
a second indicator member fixedly mounted on said support means adjacent to said first indicator member, and
a rate gyroscope including a gimbal and a rotor mounted on said gimbal for rotation about a first axis, said gimbal being mounted on said support means for rotation about a second axis defining the precession axis of said gyroscope, said second axis being substantially normal to said first axis, said second axis being vertically canted wtih respect to the longitudinal flight axis of said aircraft,
means for coupling said gimbal to said first indicator member, and
means for damping said first indicator member to eliminate short term disturbances from the rotational output thereof including first and second concentric cup members, a viscous fluid contained between said cup members and a relatively light spring joining said gimbal to said first cup member, said first cup member being attached to said first indicator member, said second cup member being fixedly mounted on said support means.

11. A turn coordinator device for use in coordinating the turning of an aircraft comprising,
a casing,
a rate gyroscope including a rotor member, a gimbal member for rotatably supporting said rotor member for rotation about a first axis, said gimbal member having a bearing shaft, and bearing means for rotatably supporting said gimbal member on said shaft in said casing for rotation about a second axis substantially normal to said first axis,
said gimbal being oriented so that said second axis is vertically canted with respect to the longitudinal flight axis of the aircraft,
indicator means for providing an indication in accordance with the rotational precession of said gimbal, and
means for coupling said gimbal to said indicator means, said coupling means including damper means for damping out short term disturbances in the rotational output of said gimbal, said damper means including a spring member, first and second concentric cup members, said spring member interconnecting said first cup member and said gimbal member, and a viscous fluid contained between said cup members, said first cup member being attached to said indicator means,
whereby said indicator rotates to produce an indication in accordance with the sum of the yaw and roll rates of said aircraft.

12. The device as recited in claim 11 wherein said cup members are fabricated of materials having substantially different coefficients of expansion so as to provide relatively uniform viscous damping in the bearing formed therebetween with changes in temperature.

References Cited

UNITED STATES PATENTS

| | | | |
|---|---|---|---|
| 1,955,488 | 4/1934 | Crane et al. | 33—204.1 |
| 2,010,191 | 9/1935 | Koch et al. | 33—204.1 |
| 2,197,890 | 4/1940 | Koster | 33—204 |
| 2,366,543 | 1/1945 | Meredith | 33—204 |
| 2,387,938 | 10/1945 | Noxon | 33—204.1 |
| 2,444,625 | 7/1948 | Bevins | 33—204.1 |
| 2,544,767 | 3/1951 | Reid | 33—204.1 |
| 2,984,114 | 4/1961 | Bostwick et al. | 74—5.5 |

LOUIS R. PRINCE, *Primary Examiner.*

DAVID SCHONBERG, *Examiner.*

N. B. SIEGEL, *Assistant Examiner.*